US008599480B2

(12) United States Patent
Danckwerts et al.

(10) Patent No.: US 8,599,480 B2
(45) Date of Patent: Dec. 3, 2013

(54) LASER SCANNING MICROSCOPE

(75) Inventors: Matthias Danckwerts, Jena (DE); Ralf Wolleschensky, Jena (DE); Joerg Steinert, Jena (DE); Robert Hauschild, Jena (DE); Stefan Wilhelm, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 610 days.

(21) Appl. No.: 12/691,185

(22) Filed: Jan. 21, 2010

(65) Prior Publication Data

US 2010/0188741 A1    Jul. 29, 2010

(30) Foreign Application Priority Data

Jan. 29, 2009   (DE) .......................... 10 2009 006 729

(51) Int. Cl.
   *G02B 21/06*   (2006.01)
(52) U.S. Cl.
   USPC ........................... 359/385; 359/350; 359/634
(58) Field of Classification Search
   USPC ......... 359/362, 363, 368, 369, 385, 387–390, 359/421–422, 599, 613, 642, 656, 661, 359/811; 362/355
   See application file for complete search history.

(56) References Cited

U.S. PATENT DOCUMENTS

| 6,061,140 | A  | * | 5/2000  | Berg et al. ...................... 356/418 |
| 6,278,555 | B1 | * | 8/2001  | Stock et al. ..................... 359/634 |
| 6,431,731 | B1 | * | 8/2002  | Krietzman ...................... 362/259 |
| 6,909,542 | B2 | * | 6/2005  | Sasaki ............................ 359/385 |
| 7,009,710 | B2 | * | 3/2006  | Sullivan et al. ................ 356/487 |
| 7,102,746 | B2 | * | 9/2006  | Zhao .............................. 356/301 |
| 7,453,578 | B2 | * | 11/2008 | Leimbach et al. ............. 356/497 |
| 7,570,428 | B2 | * | 8/2009  | Watanabe ...................... 359/586 |
| 7,599,409 | B2 | * | 10/2009 | Nishizawa et al. ............. 372/21 |
| 2007/0160093 | A1 | * | 7/2007  | Nishizawa et al. ............. 372/21 |
| 2008/0144028 | A1 | * | 6/2008  | Gruler ............................ 356/317 |
| 2009/0002670 | A1 | * | 1/2009  | Melzer et al. ................... 355/67 |

FOREIGN PATENT DOCUMENTS

| DE | 197 02 753 | 7/1998 |
| WO | WO 2008/052821 | 5/2008 |

OTHER PUBLICATIONS

Brochure: Zeiss LSM 710; www.Zeiss.de/micro; published; Feb. 15, 2008; Germany; pp. 1-32.

* cited by examiner

*Primary Examiner* — Stephone Allen
*Assistant Examiner* — Jyotsna Dabbi
(74) *Attorney, Agent, or Firm* — Frommer Lawrence & Haug LLP

(57)    ABSTRACT

A laser scanning microscope has an illumination beam path and a detection beam path. A beamsplitter is provided which reflects the illumination light in direction of the sample and transmits the detection light in direction of the detection arrangement. An additional beamsplitter is provided for reflecting the illumination light and for transmitting the detection light, this additional beamsplitter being arranged in the illumination beam path downstream of the first beamsplitter in the illumination direction, and this additional beamsplitter substantially transmits the illumination light reflected at the first beamsplitter and the detection light, but acquires a wavelength range substantially different from the first beamsplitter with respect to its reflectivity.

17 Claims, 3 Drawing Sheets

LASER SCANNING MICROSCOPE

The present application claims priority from German Patent Application No. 10 2009 006 729.9 filed on Jan. 29, 2009, the disclosure of which is incorporated herein by reference in its entirety.

BACKGROUND OF THE INVENTION

1. Field of the Invention

The present invention is directed to a laser scanning microscope with an illumination beam path and a detection beam path, where a beamsplitter is provided which reflects the illumination light in direction of the sample and transmits the detection light in direction of the detection arrangement. An additional beamsplitter is provided for reflecting the illumination light and for transmitting the detection light, this additional beamsplitter being arranged in the illumination beam path downstream of the first beamsplitter in the illumination direction. The additional beamsplitter also substantially transmits the illumination light reflected at the first beamsplitter and the detection light, but acquires a wavelength range substantially different from the first beamsplitter with respect to its reflectivity.

2. Description of Related Art

In laser scanning microscopes, laser light of one or more wavelengths $\lambda_{exc,n}$ is deflected onto the sample to excite fluorescence. This excitation light is coupled into the sample by a dichroic mirror (color splitter) which only reflects one or more narrow wavelength bands conforming to the excitation wavelengths but transmits all other wavelengths (DE 19702753A1).

The fluorescent light which is detected and which therefore serves for imaging typically has a broad emission band on the long-wavelength side of the excitation. It is guided in the return direction collinear to the excitation and passes the color splitter with the exception of the narrow wavelength bands which the color splitter is designed to reflect. Excitation light which is reflected back by the sample and which would normally exceed the fluorescence by several orders of magnitude is reflected at the color splitter and is not detected. In this way, this color splitter, designated as the main color splitter (HFT), separates the (strong) excitation light from the (weak) fluorescent light by means of wavelength-selective reflection.

The dichroic color splitters described above are based on the principle of multiple-beam interference at a dielectric multilayer system. In this respect, the angle of incidence of the light has a considerable influence on the reflectance or transmittance. The most common configuration is an incidence of less than 45° relative to the perpendicular, but orientation at an incident angle of less than 10° to the perpendicular (10-degree HFT) is also used and achieves higher suppression ratios of the excitation light.

A plurality of interference filters of this kind are combined on a filter wheel to filter different wavelengths. If different excitation lines are used simultaneously, a multiple bandpass is possible. In so doing, a plurality of narrow reflection bands are realized with a layer system on a filter. For example, it is conventional to combine 488 nm and 633 nm on a filter. The combinations are subject to strict limits because there is a limited quantity of bands that can be realized with a layer system. A compromise must be made between performance (reflectivity/fundamental suppression) and cost. This is the starting point of the invention. The invention is realized through the features of the independent patent claims. Preferred further developments are indicated in the dependent claims.

SUMMARY OF THE INVENTION

In the ZEISS LSM 710 (see the description of FIG. 1), two fundamentally separate optical input paths, defined as main color splitters for excitation, are each outfitted with a filter wheel in order to combine excitation lines in non-overlapping wavelength regions. One is the RGB path for excitation with standard wavelengths substantially in the visible region from 488 nm to 633 nm and the second is the InVIS path for wavelengths substantially outside of the visible region for 405 nm, 445 nm and IR excitation. After passing its own filter wheel, the light of one path passes the filter wheel of the other path. After this point, the paths run in direction collinear to the sample. Accordingly, the excitation lines of the two paths can be advantageously combined in a desired manner.

With two filter wheels, there are two potential sources of angular errors. In technical respects, it is difficult to ensure that the alignment of the system will remain intact when changing a filter. Complicated solutions in which the pinhole position is compensated are conventionally used for this purpose (DE 19702753 A1). With the advantageous input via two separate main color splitters, it is not sufficient to correct the position of the pinholes or the imaging on the pinhole as in the prior art owing to the two independent error sources.

According to the invention, the adjustment error (usually a small angular error) is advantageously corrected directly at, or very close to, the source so that the optical beam propagates with a faulty angle only over short distances. As a result, position errors are very small. Therefore, a simple angle correcting element with two adjustment axes is sufficient. The alignment errors caused by changing filters are compensated virtually completely.

An additional mirror can be provided in the 10-degree HFT to achieve input at 10° on the HFT. In order to keep the optical construction simple, this mirror can advantageously be used for correction at the same time in that it carries out a pivoting movement around a small angular area to achieve an exact adjustment (collinearity) of the illumination beam on the optical axis (illumination axis). The correcting movement is advantageously carried out by means of a biaxial solid-state joint (or by two single-axis solid-state joints). A solid-state joint has the advantage that there are no inaccuracies due to bearing play. Very high gear ratios can be realized in a mechanically stable manner.

Further, a tunable laser source is incorporated in the system according to the invention. Further, this tunable laser source covers the wavelength region in the VIS spectrum (490-640 nm) that is already covered by standard lasers. This is carried out by means of the construction according to the invention without compromising the fundamental suppression of the filter system through the use of dichroic filters in a 10-degree arrangement.

The tunable source can be combined with all available wavelengths. In addition, the tunability of the laser (i.e., the free choice of any wavelength with an accuracy of 1 nm (within the adjusting range of the laser)) is not impeded on the system end.

The following is realized according to the invention:
a) The greatest possible variety of color splitter filters is made available so that tunability is ensured.
b) The ability to freely combine with existing lines is ensured.

In a particularly advantageous manner, the HFT wheel in the visible RGB path is left substantially unchanged. On the other hand, the tunable laser, in spite of its wavelengths in the VIS region, is coupled in via the second, InVIS path which is actually designed for wavelengths substantially outside the visible region.

The associated HFT wheel is expanded to a plurality of positions (e.g., 12 positions) so that a larger variety of HFT filters can be used. The filters are designed in such a way that the spectral distance between the center wavelengths of the reflection bands is, for example, 15 nm. In addition, the defined bands are broader than is conventional in standard filters so that a wavelength of, for example, ±3 nm is possible in addition to the center position.

In this concept, the selectable wavelengths are discrete and not continuous; they are arranged in such a way that, for example, 487 nm, 490 nm and 493 nm can be selected with one filter and 502 nm, 505 nm and 508 nm can then be selected with the next filter. Therefore, the greatest distance between two selectable, discrete wavelengths is 9 nm, for example.

Accordingly, the maximum distance from an excitation wavelength recognized as optimal is never more than 4.5 nm, which does not represent a limitation in the field of confocal microscopes with fluorescence markers. Therefore, it is ensured in addition that while making use of the short-wavelength end of the reflection range of a filter the fluorescent light lying in the longer-wavelength region because of the Stokes shift (distance between the maximum of the excitation spectrum and the maximum of the emission spectrum) can pass the filter because the Stokes shift is greater than 10 nm in the overwhelming majority of dyes used in fluorescence microscopy.

In addition, there is the option in the indicated example of adjusting any desired wavelength by means of a neutral splitter (ratio, for example, 80/20). In doing so, compromises with respect to fundamental suppression are taken into account. The concept is preferably designed in such a way that almost every filter (with one exception) is designed with no more than one VIS wavelength so that there are no limitations of the free spectral range (transmission) for detection. The original InVIS wavelengths 405 nm and IR excitation are advantageously incorporated in each instance by an appropriate design of the coating.

Therefore, an advantageous formula for the coverage of the filter wheels at the HFT 2 could be:

> Number of filters per filter wheel=wavelength range of the tunable laser divided by the mean usable excitation spectrum of dyes (corresponds to the distance of the center wavelengths of the filters relative to one another).

An acceptable distance of the laser line from the excitation maximum of a dye is generally approximately 5 to 7 nm. This yields a usable excitation spectrum of approximately 15 nm.

With a wavelength region of 150 nm, as is specified, and a useful excitation spectrum of approximately 15 nm per filter, there will be at least 10 filters, for example, to ensure complete coverage of the wavelength region.

With an individual mirror, a reflectivity range of 5 to 10 nm is advantageous; ±3 nm from the middle wavelength is particularly advantageous. This corresponds to approximately 6 nm of bandwidth per filter.

With three discrete laser lines, as is specified, (e.g., 487, 490, 493) on the individual filter, for example, with the center wavelength 490, there is an advantageous possibility for combining coupled in wavelengths by means of the two inventive main color splitters HFT1 and HFT 2 of approximately 10 f-HFT individual filters combined with up to 10 standard filters of surprisingly high line combinations up to 300.

Accordingly, the solution combines the required large variety of color splitter filters with the ability to freely combine the two paths (i.e., particularly the VIS wavelengths of the tunable laser with the VIS wavelengths of the standard laser). Naturally, as when combining different reflection bands on one filter, the limitation of the detectable spectral region must be taken into account in this regard when the bands of different sequentially arranged filters lie too close together.

There follows a typical example of a laser configuration using the concept presented herein:

| Path 1 (LQ2, HFT 2 in FIG. 1) First beamsplitter | Path 2 (LQ1, HFT 1 in FIG. 1) Second beamsplitter |
|---|---|
| argon multi-line laser (typ. 458 nm, 488 nm, 514 nm) | diode laser 405 nm |
| diode pumped solid state laser 561 nm | tunable laser 490-640 nm |
| helium neon laser 633 nm | |

A typical configuration of the HFT wheels #1 and #2 suitable for the above would be:

| HFT wheel #1 (LQ2, HFT 2 in FIG. 1) First beamsplitter plane-parallel glass plate | HFT wheel # 2 (LQ1, HFT 1 in FIG. 1) Second beamsplitter plane-parallel glass plate |
|---|---|
| HFT 458 | f-HFT 405/490/640 |
| HFT 458/514 | f-HFT 405/505 |
| HFT 458/561 | f-HFT 405/520 |
| HFT 488 | f-HFT 405/535 |
| HFT 488/561 | f-HFT 405/550 |
| HFT 488/561/633 | f-HFT 405/565 |
| HFT T80/R20 | f-HFT 405/580 |
| | f-HFT 405/595 |
| | f-HFT 405/610 |
| | f-HFT 405/625 |
| | HFT T80/R20 |

This results in far-reaching possible combinations of up to 5 lines coupled into the sample simultaneously. This does not include the coupling in of an IR laser (Ti-sapphire) for multiphoton excitation.

The present solution is specially adapted for the above-stated problem of a tunable laser. It must be taken into consideration in this regard that the emission bandwidth of the laser is limited with an adjusted wavelength ($\lambda_c \pm \Delta 1$), particularly in contrast to a white light laser source which is characterized by extremely broad-band (white) emission. However, in the present case there is a narrow-band emission without interfering side bands which differs only negligibly in line width from typical lasers with fixed wavelengths (gas lasers or diode lasers, for example). Accordingly, it is possible to make use of all of the advantages of the dichroic main color splitters and achieve maximum flexibility at the same time.

Another approach (WO 2008052821 A1) uses an acousto-optical beamsplitter (AOBS). This acousto-optical beamsplitter is based on a crystal which is acted upon by an acoustic sound wave. Accordingly, light beams which pass the crystal are deflected differently depending on their wavelength. This makes it possible to couple out narrow-band spectral components of the incident light beam. The center wavelength of the spectral region that is separated out can be influenced by changing the frequency of the sound wave. This results in a controllable beamsplitter. The disadvantage consists in that an AOBS is very expensive. Moreover, the separated spectral region is very narrow (generally less than 2 nm). Broad-band spectral components cannot be achieved with an AOBS. Finally, a substantial disadvantage consists in the deficient fundamental suppression of a system of this kind because the dynamic damping range of an AOBS is around 2-3 optical densities (OD), whereas the fundamental suppression of an individual 10-degree HFT is 4-6 OD.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
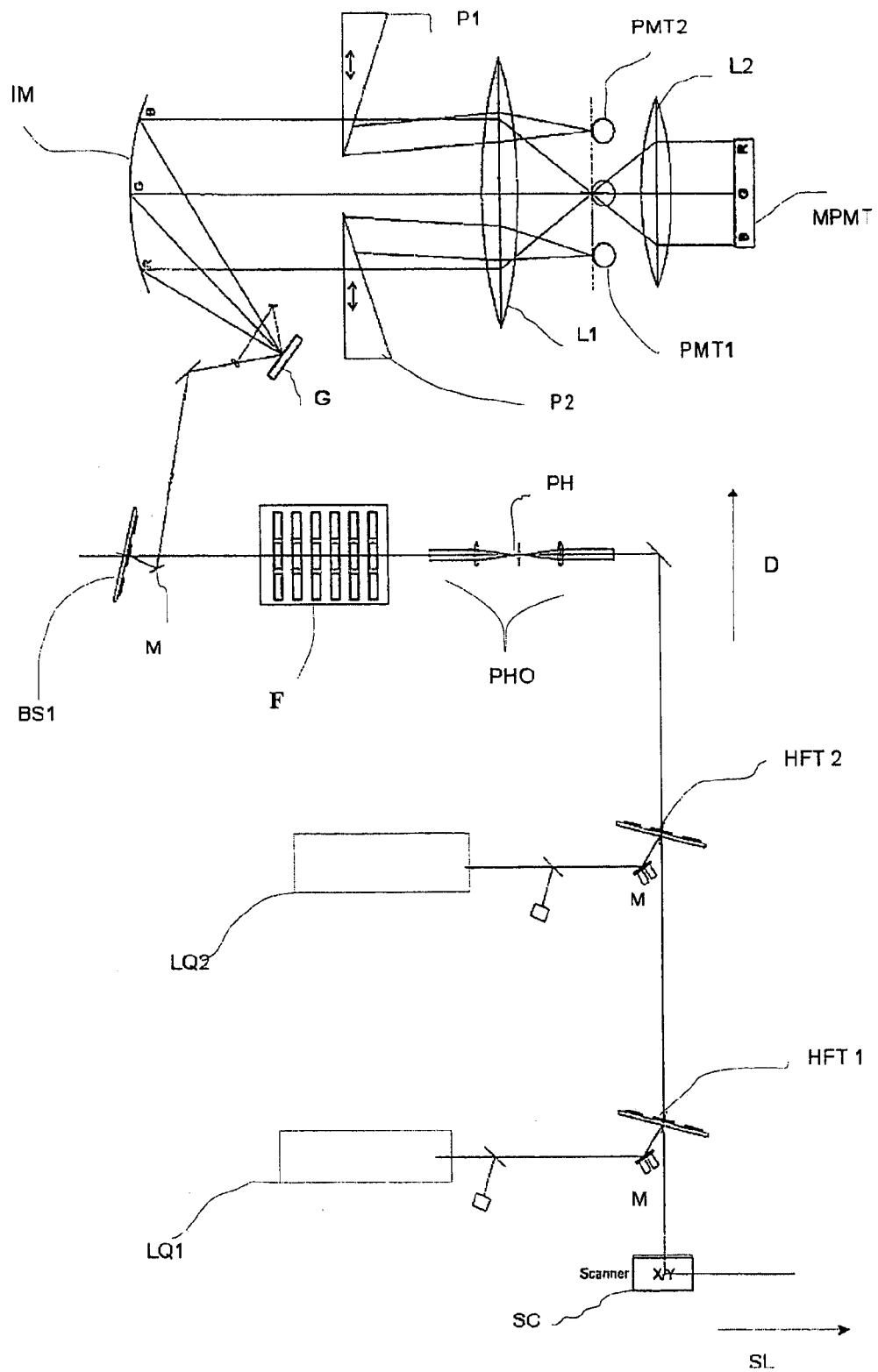
FIG. 1 shows the beam path of the ZEISS LSM 710.

FIG. 1 shows the beam path of the ZEISS LSM 710 (http://www.zeiss.de/C1256CFB00332E16/0/F7BE630BECC94A08C12573F3005483F4/$file/60-1-0001_d.pdf) with the inventive concept having two main color splitters, HFT 2 for the substantially visible region and HFT 1 for the region substantially outside the visible range, and an additional tunable laser.

The light of two lasers or laser groups LQ1 and LQ2 passes via main color splitters HFT 1 and HFT 2 for separating the illumination beam path and detection beam path. These main color splitters HFT 1 and HFT 2 can be constructed so as to be switchable as dichroic filter wheels and can also be exchangeable so as to have a flexible choice of wavelengths and to reflect the illumination light initially via a scanner, which preferably comprises two independent galvanometric scanning mirrors for X and Y deflection in the direction of scanning optics SL, not shown, and then to the sample in conventional manner via the microscope objective. The sample light travels in reverse direction through the splitters HFT 1, HFT 2 in direction of the detection arrangement D. The detection light first passes a pinhole PH via pinhole optics PHO which are arranged in front of and behind the pinhole and a filter arrangement F for narrow band filtering of unwanted beam components (e.g., notch filters) and then passes via a beamsplitter BS1, which optionally enables a coupling out to external detection modules by corresponding switching via a transmissive component, a mirror M and additional deflection means to a grating G for spectral splitting of the detection beam. The divergent spectral components which are split by the grating G are collimated by an imaging mirror IM and travel in direction of a detector arrangement comprising individual PMT 1, PMT 2 in the edge area and a centrally arranged multichannel detector MPMT. Instead of the multichannel detector, another individual detector can also be used.

Two prisms P1, P2 which are displaceable perpendicular to the optical axis are located in the edge area in front of a lens L1 and unify a portion of the spectral components which are focused on the individual PMT 1 and PMT 2 by the lens L1. After passing through the plane of the PMT 1 and PMT 2, the remaining portion of the detection beam is collimated by a second lens L2 and is directed in a spectrally separated manner to the individual detection channels of the MPMT.

By displacing the prisms P1, P2, a flexible adjustment can be carried out so as to define which portion of the sample light is detected in a spectrally separated manner by the MPMT and which portion combined by the prisms P1, P2 is detected by the PMT 1 and PMT 2.

Figure 2:
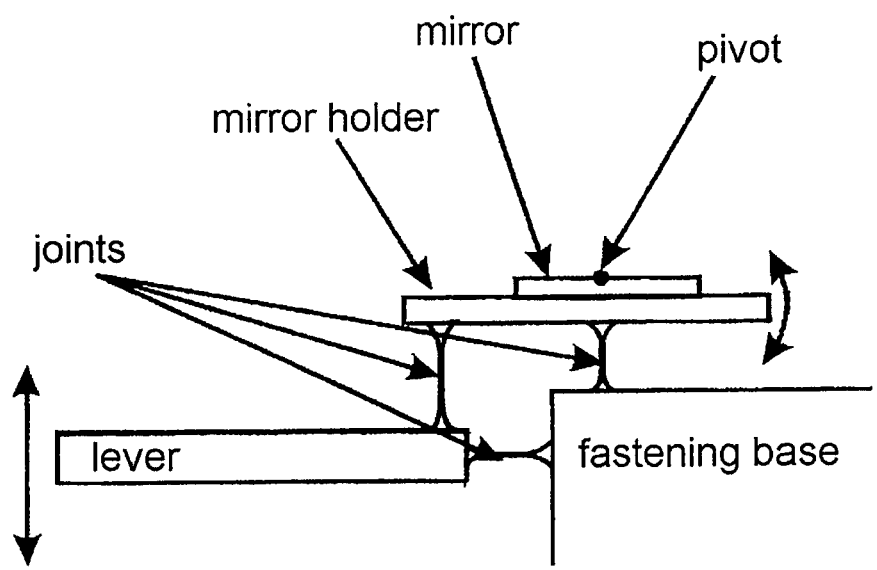
FIG. 2 shows the operation of an adjustable coupling mirror M from FIG. 1.

FIG. 2 shows the operation of an adjustable coupling mirror M from FIG. 1. The construction of the mirror as a solid-state joint mirror for tilting the mirror in one direction (e.g., x-direction) is shown schematically. The lever shown in the drawing is generally actuated by a motor to realize an adjustment of the mirror angle around the pivot shown in the drawing.

The use of solid-state joints makes it possible to adjust small deflection angles of the laser light in an extremely precise manner without play. An additional tilting of the mirror in y-direction can be realized by combining with another solid-state joint.

Figure 3:
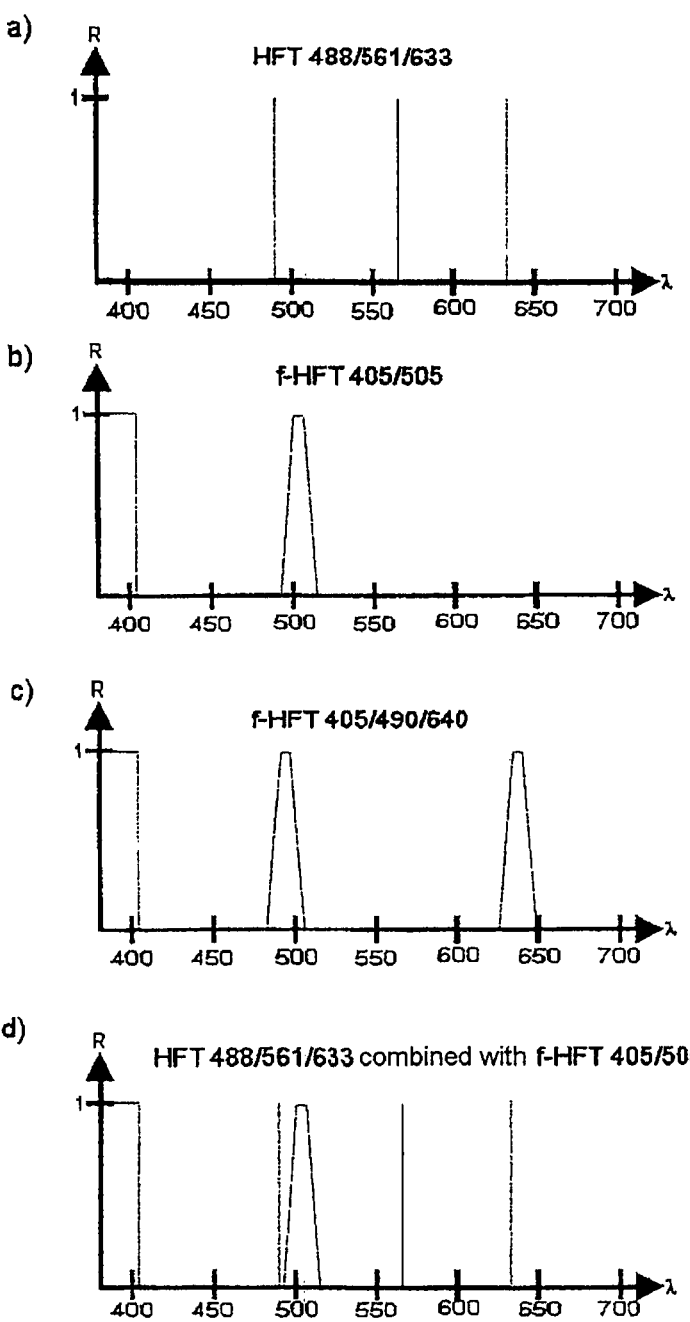
FIGS. 3a)-d) shows examples of reflection curves of individual reflection filters on the filter wheels

FIG. 3 shows examples of reflection curves of individual reflection filters on the filter wheels.

FIG. 3a) shows the reflection curve of a conventional main color splitter on HFT-wheel #1 with three discrete reflection regions for wavelengths 488 nm, 561 nm, and 633 nm.

FIG. 3b) shows the reflection curve for a main color splitter according to the invention on HFT wheel #2 for reflecting wavelengths in ranges up to 405 nm and 502-508 nm.

FIG. 3c) shows the reflection curve for a main color splitter according to the invention on HFT wheel #2 for reflecting wavelengths in ranges up to 405 nm and 487-493 nm and 637-643 nm.

FIG. 3d) shows the effective reflection range according to the invention, by way of example, using the filter from FIG. 3a on HFT wheel #1 and the filter from FIG. 3b on HFT wheel #2.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:
1. A laser scanning microscope comprising:
an illumination beam path of illumination light;
a detection beam path of detection light;
a first beamsplitter which reflects the illumination light in a direction of a sample, and transmits the detection light in a direction of a detection arrangement; and
a second beamsplitter which reflects the illumination light and transmits the detection light;
wherein the second beamsplitter is arranged in the illumination beam path downstream of the first beamsplitter in an illumination direction;
wherein the second beamsplitter transmits the illumination light reflected at the first beamsplitter and the detection light, but acquires a wavelength range different from the first beamsplitter with respect to the reflectivity of the second beamsplitter;
wherein a wavelength region of reflection for the first beamsplitter lies substantially in the visible region, and a first wavelength region of the second beamsplitter lies substantially in the edge area of the visible light region and outside the visible region; and wherein the second beamsplitter has a second reflectivity region which is adapted to the wavelength region of a tunable laser in the visible region.

2. The laser scanning microscope according to claim 1; wherein either the first or second beamsplitter has an angle of less than 20 degrees to an optical axis or an illumination axis, and an angle of less than 20 degrees to a detection axis.

3. The laser scanning microscope according to claim 2; wherein the angle is approximately 10 degrees.

4. The laser scanning microscope according to claim 1; wherein the detection light passes through a central pinhole which is provided behind the first and second beamsplitters in a detection direction.

5. The laser scanning microscope according to claim 1; wherein a rotatable mirror, which adjusts an incident angle on one of the first and second beamsplitters, is arranged in front of the one beamsplitter in the illumination direction.

6. The laser scanning microscope according to claim 5; wherein the mirror is constructed as a solid-state joint mirror.

7. The laser scanning microscope according to claim 5; wherein the adjustment of the incident angle adjusts the collinearity of at least one illumination laser relative to the optical axis.

8. The laser scanning microscope according to claim 1; wherein UV light and/or IR light is reflected into the illumination beam path by the second beamsplitter.

9. The laser scanning microscope according to claim 1; wherein the wavelength region of the tunable laser is approximately 490 to 640 nm.

10. The laser scanning microscope according to claim 1; wherein the second reflectivity region is formed by individual mirrors which can be swiveled into or slid into the beam path; and wherein, with respect to the wavelength of the tunable laser, each individual mirror has a narrow-band reflectivity in a region of about 5 to 10 nm of the wavelength region of the tunable laser.

11. The laser scanning microscope according to claim 10; wherein the individual mirrors are constructed so as to transmit outside their reflectivity region.

12. The laser scanning microscope according to claim 10; wherein the individual mirrors have a second reflectivity region which is adapted to the coupled-in UV light and/or IR light.

13. The laser scanning microscope according to claim 10; wherein the distance of the center wavelength region of the individual mirrors relative to one another is about 15 nm.

14. The laser scanning microscope according to claim 1; wherein at least ten narrow-band individual mirrors are provided in a tuning range of the tunable laser of about 150 nm.

15. The laser scanning microscope according to claim 1; wherein lasers are used as light sources.

16. The laser scanning microscope according to claim 1, further comprising:
the following lasers for coupling in via the two beamsplitters:

| First beamsplitter | Second beamsplitter |
| --- | --- |
| argon multi-line laser (typ. 458 nm, 488 nm, 514 nm) | diode laser 405 nm |
| diode pumped solid state laser 561 nm | tunable laser 490-640 nm |
| helium neon laser 633 nm | |

17. The laser scanning microscope according to claim 1, further comprising:
the following color splitters for the two beamsplitters:

| First beamsplitter plane-parallel glass plate | Second beamsplitter plane-parallel glass plate |
| --- | --- |
| HFT 458 | f-HFT 405/490/640 |
| HFT 458/514 | f-HFT 405/505 |
| HFT 458/561 | f-HFT 405/520 |
| HFT 488 | f-HFT 405/535 |
| HFT 488/561 | f-HFT 405/550 |
| HFT 488/561/633 | f-HFT 405/565 |
| HFT T80/R20 | f-HFT 405/580 |
| | f-HFT 405/595 |
| | f-HFT 405/610 |
| | f-HFT 405/625 |
| | HFT T80/R20 |

* * * * *